June 12, 1951     R. K. ENGHOLDT     2,556,908
TIME-CONTROLLED VALVE
Filed May 2, 1949     3 Sheets-Sheet 1
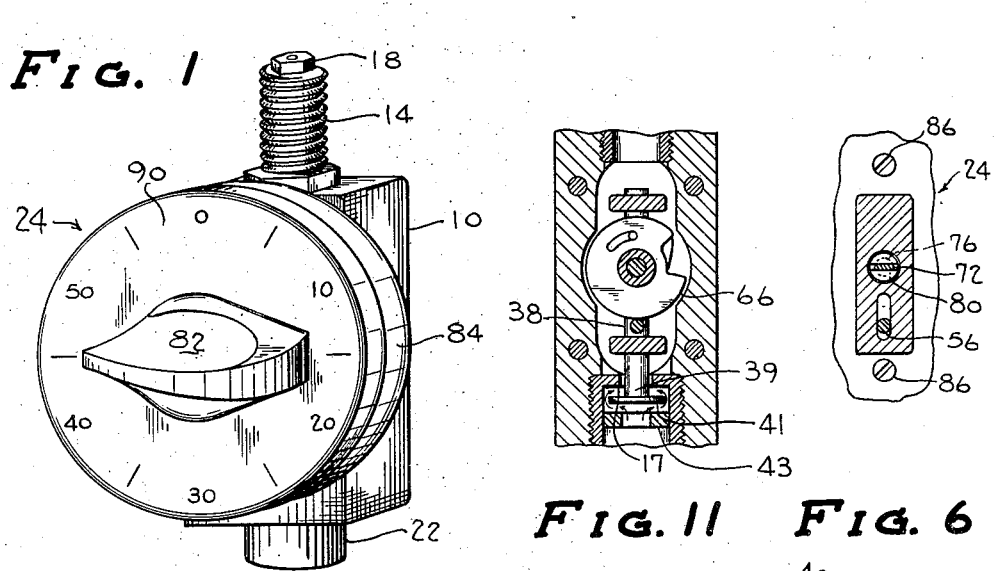
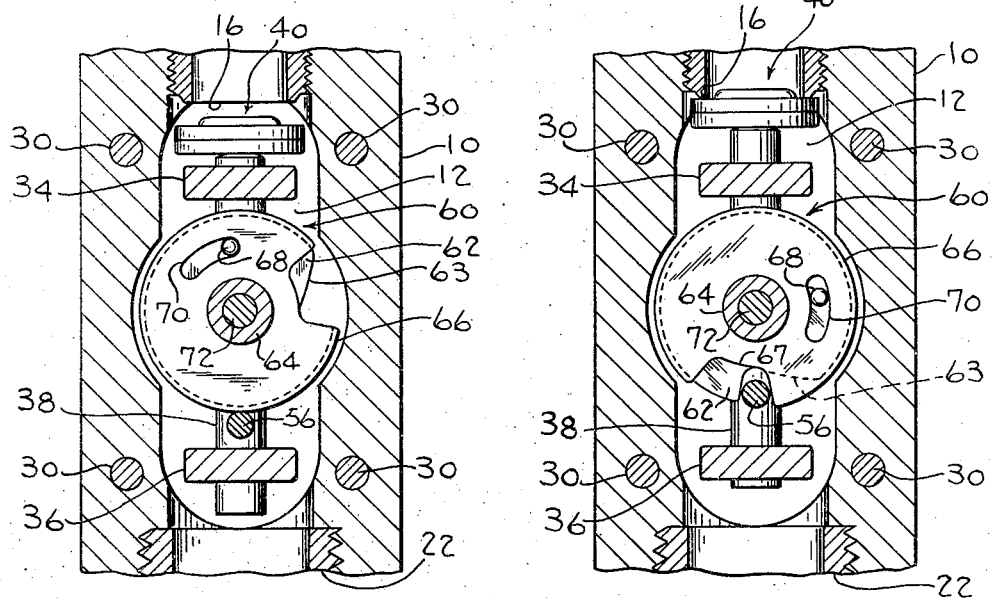
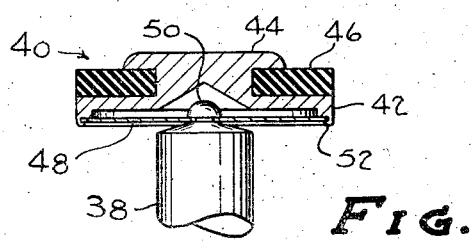
INVENTOR.
RICHARD K. ENGHOLDT
BY John W. Michael
ATTORNEY June 12, 1951 R. K. ENGHOLDT 2,556,908
TIME-CONTROLLED VALVE
Filed May 2, 1949 3 Sheets-Sheet 2
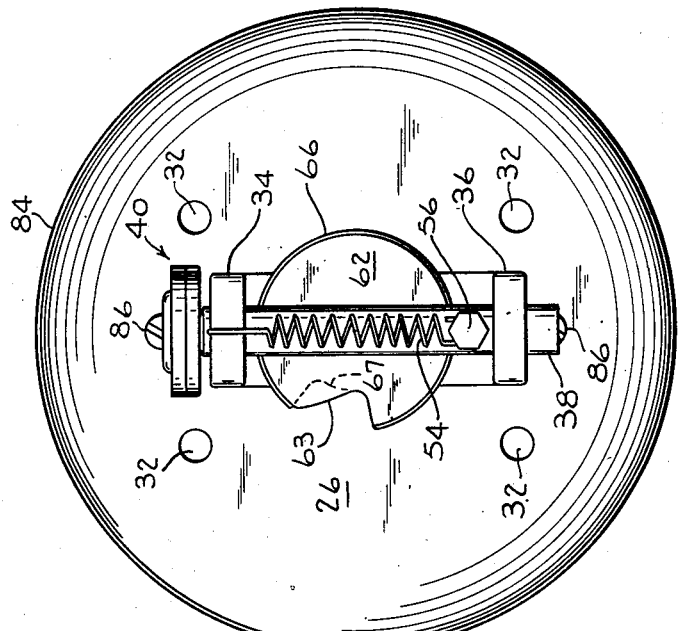
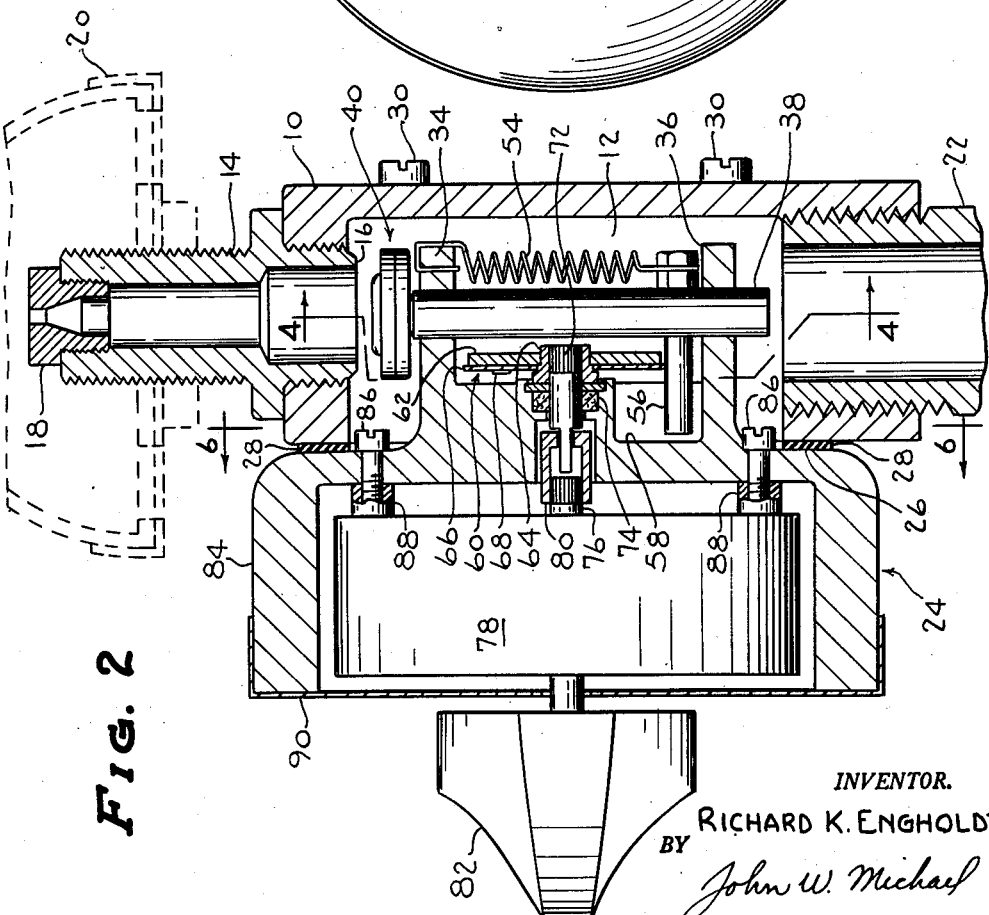
INVENTOR.
RICHARD K. ENGHOLDT
BY John W. Michael
ATTORNEY

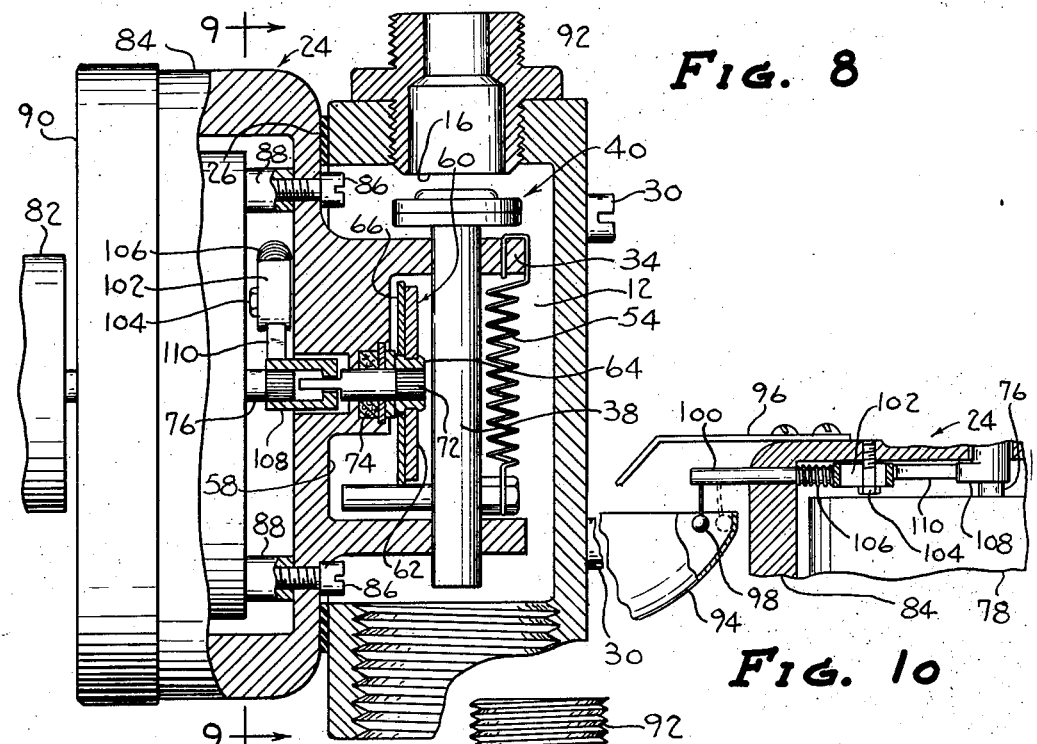

Patented June 12, 1951

2,556,908

UNITED STATES PATENT OFFICE 2,556,908

TIME-CONTROLLED VALVE

Richard K. Engholdt, Milwaukee, Wis., assignor to Erie Manufacturing Co., Milwaukee, Wis., a corporation of Wisconsin Application May 2, 1949, Serial No. 90,875

8 Claims. (Cl. 161—7)

This invention relates to improvements in time-controlled valves.

Valves for controlling the flow of fluids, for example cooking gas, must meet definite safety requirements among which is positive leak-proof closure. It has therefore been a problem to operate such valves by timing mechanisms as leakage can occur if the timing mechanism fails to effect a complete closure of the valve.

Time-controlled gas valves accompanied by audible alarms may be advantageously used with baking ovens. However on manually lighted ovens, if the alarm is sounded simultaneously with the closing of the valve, if further baking is found necessary, the oven must be relighted with attendant difficulty and uncertainty.

It is an object of the invention, therefore, to provide a time-controlled valve which will be positive in its action and which will completely close to prevent leakage.

Another object of this invention is to provide a time-controlled fluid valve with an associated alarm which will sound a sufficient time interval before the valve is closed by the timing mechanism to permit an inspection and the resetting of the timing mechanism if necessary.

A still further object of this invention is to provide a time-controlled fluid valve which is of simple construction, economical to manufacture, and may be supplied as a complete unit ready for installation with hot water heaters, baking ovens, other units utilizing manually operated gas burners, water control for water softeners, and other places where timed control of fluids is needed.

The first of these objects is obtained by providing a valve casing having a chamber with an inlet, outlet, and a side opening. A closure member for this opening has a valve guide on its inner side in which is reciprocally carried a valve operating stem. When the closure member is in position on this opening the valve operating stem is in axial alinement with the outlet. The stem is spring-biased toward the outlet. With some types of fluid such as gas the valve seat is on the inner side of the outlet and the valve disc is carried on the end of the stem opposite the outlet. With other types of fluid, such as water, the valve seat may be positioned on the outer side of the inlet. In such case the other end of the stem projects through the outlet to operate the valve disc. The advantage of this is that the fluid pressure by acting on the valve disc aids the valve spring in maintaining the valve disc tightly seated. The valve operating stem is opened and held in open position by a cam rotatably mounted in the closure member with its axis of rotation substantially normal to the axis of the stem. As the cam is manually rotated in one direction it moves said stem and unseats the valve disc. At the same time a timing mechanism also mounted on the closure member is energized. When the cam is rotated in the opposite direction, either manually or by the timing mechanism, a predetermined position is reached on said cam where support for the stem is suddenly released and the valve disc snaps to closed position. Such sudden release and snap closing effects a complete closing of the valve and prevents leakage. In addition, this arrangement permits the operating stem and its entire operating and timing mechanism to be readily removed from the valve casing by the simple expedient of removing the closure member.

The second object of this invention is obtained by providing a bell or other audible alarm, the striker of which is also controlled by the timing mechanism which operates the rotatable valve controlling cam. A spring arm or other actuating member rotates with the timing mechanism for the cam and is so angularly spaced from the sudden release position of the cam that the alarm is sounded before the valve is closed. This is an important feature in manually controlled and lighted gas burners for ovens. The time required for the baking of a cake or other pastry cannot be accurately predetermined because of varying conditions. It requires actual inspection and testing of the cake or pastry during the baking thereof to determine when it is about finally done. If, after a selected interval of time the alarm sounds and the gas valve simultaneously closes, an inspection shows that further baking was necessary, the oven would have to be relighted. The manual relighting of a hot oven is not only extremely difficult but is frequently dangerous. Hence, it is desirable that the audible alarm sound approximately five minutes before the valve automatically closes. During this five minute interval the operator can inspect the cake or pastry and determine if more or less than the remaining five minutes is required. In either event the timing mechanism may be readjusted to the newly selected period and the gas burner will operate for such new period without interruption.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a perspective view of a time-controlled valve embodying the present invention;

Fig. 2 is a view in vertical section of such time-controlled valve;

Fig. 3 is a view of the inner side of the closure member constituting an element of such time-controlled valve;

Fig. 4 is a fragmentary sectional view taken on line 4—4 of Fig. 2 showing the position of the cam while holding the valve open;

Fig. 5 is a sectional view similar to the view of Fig. 4 with the cam rotated to the sudden release position and the valve closed;

Fig. 6 is a fragmentary sectional view taken on line 6—6 of Fig. 2;

Fig. 7 is a fragmentary enlarged sectional view of the valve disc comprising an element of this invention;

Fig. 8 is a view partly in side elevation and partly in vertical section of a modification of the time-controlled valve having associated therewith an audible alarm mechanism;

Fig. 9 is a sectional view taken on line 9—9 of Fig. 8;

Fig. 10 is a fragmentary sectional view taken on line 10—10 of Fig. 9; and

Fig. 11 is a fragmentary sectional view showing a modification of the time-controlled valve when used with water.

Referring to the drawings by reference numerals, the time-controlled valve consists of an elongated valve casing 10 having a chamber 12 which opens to one side of the casing. The casing is provided at its top and bottom with threaded openings. The lower opening or inlet is adapted to threadedly engage with a gas supply pipe 22. In the upper opening or outlet there is threaded a nipple 14 having a valve seat 16 at its inner end and threadedly mounting a spud 18 at its upper end. The nipple 14 is externally threaded so that it may be connected with a standard Venturi tube diagrammatically indicated by dotted lines at 20. This construction of the valve casing and its connections permits the valve as a unit to be readily secured to the gas supply pipe and fitted in a Venturi tube in such a manner that there is only a very short gas passage between the seat of the valve and the spud outlet. This of itself is a factor in making the valve more safe.

A closure member 24 for the opening in the valve casing is generally cylindrical in shape and has an inner surface 26 which seats against the face of the valve casing surrounding the side opening. A gasket 28 is inserted between the closure member 24 and the side of the valve casing to prevent any leakage therebetween. The closure member 24 is secured to the valve casing 10 by four bolts 30 which extend through the valve casing outside of the chamber 12 and threadedly engage with the inner face 26 in the threaded apertures 32. The closure member 24 provides a mounting for the valve-operating stem, its actuating mechanism, the timing mechanism, the dial, and the manual control. Hence, whenever the closure member 24 is disconnected and removed, the entire operating mechanism of the valve is also removed for inspection, repair, or replacement. In order to support the valve-operating stem disc there projects from the inner face 26 an upper guide 34 and a lower guide 36. These guides have alined valve stem bearings in which is slidably mounted a valve-operating stem 38. The valve stem bearings are positioned inwardly of the inner face 26 to guide the valve stem in substantial axial alinement with the outlet. A valve disc 40 is carried on the upper end of the stem 38 and, when the stem is moved longitudinally toward the seat 16, the valve disc engages the seat 16 to close the outlet. The details of the construction of valve disc 40 are illustrated in Fig. 7. A disc body 42 with a button head 44 supports a silicon rubber washer 46. The washer 46 may be readily withdrawn from the head 42 for replacement. A spring plate 48 is pinned to the top of the stem 38 by pin 50 and the periphery of the plate 48 fits within a circumferential seat in the body 42 and is held therein by peaning over the marginal edges of the flange as indicated at 52. The plate 48 being flexible permits the valve stem to have some relative longitudinal movement with respect to the valve disc 40 as well as permitting that disc to have limited angular or swivelling movement with respect to the axis of the stem 38.

The stem 38 is constantly urged toward the seat 16 by a coiled tension spring 54 secured to the upper guide 34 and to the head of a pin 56 passing through the stem 38. This pin projects radially from the stem 38 and rides in a slot 58 in the enclosure member 24 to prevent the stem from rotating while permitting it to have free longitudinal movement. With this construction the valve disc 40 is constantly urged into engagement with seat 16 by the force of spring 54. However, since the chamber 12 is also a pressure chamber, as soon as the valve disc 40 seats, the pressure in the chamber will be added to the force exerted by the spring 54 to maintain the valve disc tightly engaged with the seat and thus prevent leakage.

In order to open the valve and maintain it open for a selected time, there is provided a rotary time-controlled cam 60. The cam 60 consists of a main disc 62 rigidly mounted on a hub 64 and an auxiliary disc 66 of slightly larger diameter loosely rotatable on such hub. The main disc has a pin 68 which is slidably received in an arcuate slot 70 formed in the auxiliary disc 66. The main disc has a notch 63 in its periphery one edge of which is sloping. The auxiliary disc 66 has a notch 67 in its periphery both edges of which are substantially radial. The hub 64 is rigidly mounted on a stub shaft 72 rotatably mounted in the closure member 24 by a fluid leak-proof bearing 74. When the cam 60 is positioned as shown in Fig. 5 and the shaft 72 rotated in a clockwise direction (as viewed in Figs. 4 and 6), the main disc 62 also rotates and the sloping edge of notch 63 engages the pin 56 to open the valve. During the initial rotation the auxiliary disc 66 remains in the angular position shown in Fig. 5 until the pin 68 moves to the clockwise leading edge of slot 70. At this phase the pin 56 will have been raised to the outer edge of notch 67 and will thereafter ride on the periphery of auxiliary disc 66 as it thereafter rotates with the main disc 62. Assuming that the cam is rotated clockwise to the position shown in Fig. 4, and then reverse or counter-clockwise rotation is imparted to the shaft 72, the main disc 62 will immediately commence counter-clockwise motion but the auxiliary disc 66 will not rotate until the pins 68 engages the counter-clockwise leading edge of slot 70. When this occurs, both discs will rotate in unison with the sloping edge of notch 63 in advance of the counter-clockwise leading edge of notch 67. When such leading edge passes the high point of contact with pin 56, the force of spring 54 will cause the auxiliary cam 66 to suddenly advance counter-clockwise ahead of the slowly revolving main cam 62. This permits the valve stem 38 to snap into the closed position shown in Fig. 5. Such snap action is important in order that the valve may be closed suddenly by an independent force operating separately from the time-controlling mechanism.

Cam 60 may be both manually controlled and time-controlled. An arbor 76 of a clock work (diagrammatically shown at 78) is connected by a coupling 80 to the cam control shaft 72. The clock work is of well-known standard construction and when the arbor 76 is manually rotated in a clockwise direction (as viewed in Fig. 1) by an indicator 82, the timing mechanism is energized so that upon the release of the manual force the arbor will rotate at a timed rate in a counter-clockwise direction. The clock work 78 is mounted and held by two bolts 86 within a housing 84 formed on the outer side of the valve closure member 24. Spacers 88 on the bolts 86 hold the clock work 78 in the desired position within such housing. The housing 84 is closed by a cover member 90 which fits thereover. This member has on its face numbers for indicating minutes of time in a manner well known for timing mechanisms. When the indicator 82 is moved clockwise from the zero position, the clock work mechanism is wound and the cam 60 operated as previously described to open the valve. If the manual force is removed the cam-operating shaft 72 rotates in the counter-clockwise direction under the control of the timing mechanism until the cam 60 permits the previously described snap closing of the valve. If it is desired to close the valve before the expiration of the time selected, the arbor 76 may be manually rotated in a counter-clockwise direction irrespective of the timing mechanism by force applied to the indicator 82.

When the valve is used to control the flow of fluid, such as water, the valve seat and disc are arranged as shown in Fig. 11. The seat 17 is on the outer side of the inlet and the disk valve 41 floats between the inlet and a spacer 43. The water pressure normally closes the valve by forcing the disc against the seat. To open the valve the valve-operating stem 38 of the previous description is made longer so that its lower end 39 projects into the outlet (when held down by auxiliary disc 66) to hold the disc valve 41 off the seat 17.

When the time-controlled valve is to be used in connection with a baking oven, it is desirable to have an audible alarm associated with the time-controlled gas valve. One embodiment showing the incorporation of an audible alarm with the gas valve is shown in Figs. 8, 9 and 10. The construction of the valve and timing mechanism of this modification is identical with that of the time-controlled valve previously described except that (1) in place of the nipple 14 there is substituted a standard connector 92 by which the valve may be connected to a pipe leading from the valve to the oven burner and (2) in the place of the coupler 80 there is substituted a special form of coupler 108 hereinafter more particularly described.

The audible alarm in this exemplification consists of a bell 94 mounted to one side of the valve enclosure member 24 by means of a bracket arm 96. The open end of the bell faces toward the rear of the closure member 24 to permit the bell striker to have operable access to the bell. This relationship, however, is not essential to the invention and other positions the bell may be placed in. For example, the bell may surround the housing 84 rather than being positioned to one side thereof. The mechanism for sounding the bell comprises a ball-like striker 98 flexibly depending from the end of a rod 100 mounted in the wall of the housing 84 for limited longitudinal movement. The end of the rod 100 within the housing 84 is provided with a slotted guide 102 which rides on a pin 104. This pin and slot arrangement prevents the rod 100 from rotating and determines its inner limit of movement or striking position. A spring 106 surrounding the rod 100 acts between the wall of the housing 84 and the slotted guide 102 to normally continually urge the rod 100 to its striking position. A coupler 108 in this modification is provided with a slotted spring mounting projection. A spring 110 has one end rigidly fixed in such slot so that it rotates with the coupler. Its free end extends radially of the shaft 72 and projects beyond the end of slotted guide 102 so that upon angular movement of the spring 110, as the shaft 72 is rotated (from position A to position B shown in dotted lines), it will engage with the end of the slotted guide 102 and force such guide and rod 100 outwardly against the compression in coil spring 106. During such angular movement the spring 110 will be flexed as shown in the full lines of Fig. 9. However, as soon as the end of the spring 110 passes the center of the end of guide 102, it will snap out of engagement therewith and the force impressed on coil spring 106 will suddenly force the rod 100 to its bell-striking position. The impetus imparted to the striker 98 will cause it to flex inwardly and momentarily strike the edge of the bell 94.

An important feature of this invention resides in the angular relationship of the coupling member 108 with respect to the release position of the cam 40. As is shown in Fig. 9 the spring 110, when unflexed in position B, is behind the leading counterclockwise edge of notch 67 about forty-five degrees. The object of this is to have the bell strike approximately five minutes before the cam 40 suddenly releases the pin 56 for closure of the valve.

There are other ways than the spring mechanism herein shown for actuating the striking mechanism of the bell. The important relationship is, however, that the means for actuating the striking mechanism be timed with the valve control cam, either by energization from such cam or by a shaft by which such cam is controlled, so that the striking takes place a sufficient amount of time prior to the closing of the valve to permit of an inspection of the contents of the oven and such resetting of the timing element as may be indicated by such inspection without having the valve close and the gas burner turn off. It is a difficult and dangerous task to relight a manually controlled oven after it has reached baking temperature. This danger is avoided by this invention.

Although only several embodiments of the invention are shown and described herein, it will be understood that this application is intended

I claim:

1. A time-controlled valve comprising a chamber, an inlet and outlet communicating with said chamber, a side opening for said chamber, a closure member for said opening having a valve stem guide on the inner side thereof, a valve stem slidably mounted in said bearing and resiliently urged axially in one direction, a valve disc carried by said stem and operable to close said outlet, said guide in the chamber-closing position of said closure member guiding said stem in substantially axial alinement with said outlet, a rotary cam carried by said closure member with the axis of rotation thereof substantially normal to the axis of said valve stem, said cam being rotatable in one direction to move said valve stem to open position and rotatable in the opposite direction to a predetermined position to permit said valve stem to snap to closed position, and timing means carried on said closure member and to operate said rotatable cam.

2. A time-controlled valve as claimed in claim 1 in which said valve disc consists of a rubber-like seat mounted on a metal backing, which backing is connected with said stem by a flexible member thus permitting the valve disc to swivel with respect to said stem and have a close fit on said outlet.

3. A time-controlled gas valve comprising an elongated valve casing one side of which opens into a valve chamber, a nipple mounted in one end of said casing to provide an outlet from said chamber having a valve seat at its inner end, said nipple being adapted at its other end to mount a spud and being connectible with the Venturi tube of a gas burner, an inlet in said casing to said chamber adapted to be connected to a gas supply pipe, a closure member for the open side of said valve casing, said closure member on its inner side being provided with a valve stem guide positioned when said closure member is in normal chamber-closing position to axially aline a valve stem with the axis of said outlet, a valve stem mounted in said bearing and spring-biased toward said valve seat, a valve disc mounted on the end of said stem adjacent said outlet whereby said disc is normally urged into position against said seat to close said valve, a cam rotatably carried by said closure member with the axis of rotation thereof substantially normal to the axis of said valve stem, said cam member being rotatable in one direction to move said valve stem to valve disc open position and maintain said valve disc in said open position, said cam upon rotation in the opposite direction maintaining said valve stem in said valve disc open position until a predetermined position on said cam is reached permitting said valve stem to be suddenly released and said valve disc snapped to closed position, and timing means carried by said closure member to operate said cam toward said predetermined position.

4. A time-controlled gas valve as claimed in claim 3 in which said valve stem is provided with a pin and said closure member provided with a slot in which said pin slides to permit longitudinal movement of said stem while preventing rotation thereof.

5. A time-controlled valve comprising a chamber, an inlet and outlet for said chamber, a valve disc mounted in said chamber and spring-biased to seat against and close said outlet, cam means in said chamber movable in one direction to lift said valve disc and open said outlet and movable in the opposite direction to a predetermined place to suddenly release said valve disc whereby said disc snaps to closed position, and means for timing the movement of said cam in said opposite direction.

6. The time-controlled valve claimed in claim 5 in which said valve disc, cam means, and timing means are mounted on a closure member for said chamber and removable from said chamber with said member.

7. A time-controlled valve comprising a chamber, an inlet and outlet for said chamber, a valve-operating stem wholly contained within and mounted in said chamber and spring-biased to move toward one end thereof, movable cam means in said chamber operable in one direction to move said stem toward the other end thereof and operable in the reverse direction to suddenly release said stem, valve means operated by said stem, and means contained in said chamber and cooperable with one of said inlet or outlet and for timing the movement of said cam in said reverse direction.

8. A time-controlled valve comprising a valve casing provided with a chamber having an inlet and outlet, said outlet being provided with a valve seat, an opening for said chamber at the side of said casing, a closure member for said opening having a valve stem guide, a valve stem carried by said guide in axial alinement with said outlet opening when said closure member is in chamber-closing position, a valve disc carried by said stem fittable on said seat to close said outlet, timed camming means carried by said closure member movable in one direction to move said stem to raise said valve disc from said seat, said means being rotatable in the opposite direction to a predetermined position to permit said valve disc to snap to closed position on said valve seat, an audible alarm associated with said valve, and means for causing said alarm to produce an audible signal, said means being operated synchronously with said camming means to cause said signal to be given prior to said cam reaching said predetermined position.

RICHARD K. ENGHOLDT.

REFERENCES CITED

The following references are of record in the file of this patent:

UNITED STATES PATENTS

| Number | Name | Date |
| --- | --- | --- |
| 2,202,721 | Anderson | May 28, 1940 |
| 2,208,956 | Allenbaugh | July 23, 1940 |
| 2,315,774 | Couzens | Apr. 6, 1943 |